July 30, 1940.                F. TURSHIN                2,209,430
STORAGE CONTAINER
Filed Nov. 25, 1938

INVENTOR
FRANK TURSHIN
BY Ralph Kalish
ATTORNEY

Patented July 30, 1940

2,209,430

UNITED STATES PATENT OFFICE 2,209,430

STORAGE CONTAINER

Frank Turshin, St. Louis, Mo.

Application November 25, 1938, Serial No. 242,259

1 Claim. (Cl. 219—38)

This invention relates in general to certain new and useful improvements in storage containers and, more particularly, to a storage container adapted for retaining a substantial quantity of a prepared solution, such as a shampoo solution, for instance.

My invention has for its primary objects the provision of a storage container which is unusually attractive in appearance, economical in cost, and rugged in construction, which will accurately maintain a substantial quantity of stored liquid at a predetermined temperature, which will deliver the stored solution at the predetermined temperature without material loss of heat, which will, if desired, deliver a predetermined measured quantity of the stored solution, and which is otherwise highly efficient in the performance of its stated functions.

And with the above and other objects in view, my invention resides in the novel features of form, construction, arrangement, and combination of parts presently described and pointed out in the claim.

Figure 2:
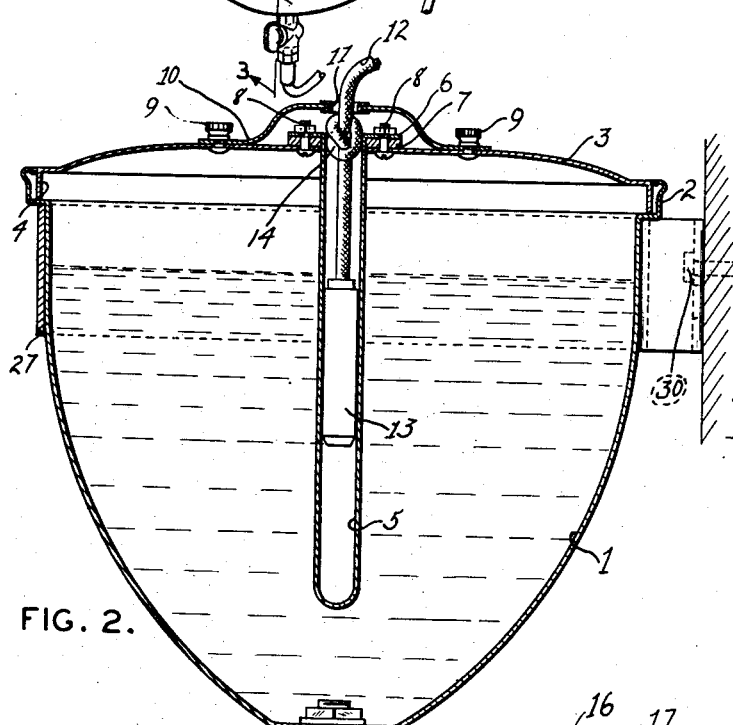
Figure 2 is a vertical sectional view of the container, taken approximately along the line 2—2, Figure 1.

Referring now in more detail and by reference characters to the drawing, which illustrates a preferred embodiment of my present invention, 1 designates an open-topped container shell preferably of inverted conoidal shape and formed of enameled sheet metal or other suitable material and being provided along its upper margin with a radially outwardly extending annular rim-flange 2, as best seen in Figure 2 and for purposes presently more fully appearing.

Provided for snug-fitting removable disposition across the open top of the container shell 1, is a lid member 3 having a downwardly extending marginal skirt 4 for seating engagement upon the rim-flange 2. The lid member 3 is centrally apertured for receiving an aluminum tube 5 extending downwardly therethrough into the interior of the container shell 1 and being closed or sealed off at its lower end. At its upper open end the aluminum tube 5 is provided with an outwardly extending annular attachment flange 6 and an annular insulating and cushioning washer 7 apertured for accommodating conventional attachment bolts 8.

Removably mounted upon the upper face of the cover member 3 over the upper open end of the aluminum tube 5 by means of conventional thumb nuts 9, is a protective cover member 10 provided with a central aperture 11 in upwardly spaced alignment with the open end of the aluminum tube 5 for accommodating a conventional electrical conductor cord 12 which passes therethrough and extends downwardly into the aluminum tube 5, being provided at its lower end with a heater element 13 preferably, though not necessarily, of the resistance type. In order that the heater element 13 be suspended within the aluminum tube 5, the electric cord 12 is preferably provided with a knot 14 large enough to become lodged in the upper end of the tube 5, as best seen in Figure 2.

Figure 4:
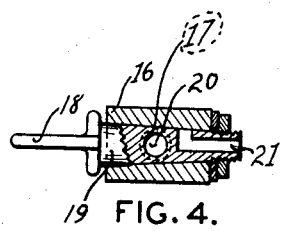
Figure 4 is a transverse sectional view of the valve mechanism, taken approximately along the line 4—4, Figure 3.
Figure 5:
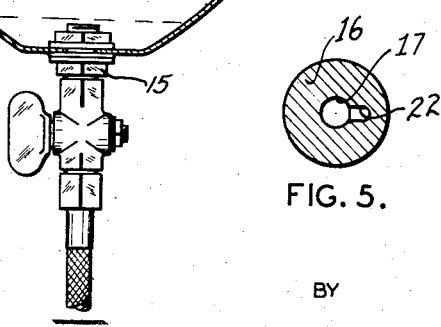
Figure 5 is a horizontal sectional view of the valve mechanism, taken approximately along the line 5—5, Figure 3.

Operatively mounted in, and extending through, the bottom of the container shell 1, is a nipple 15 threadedly connected at its lower end to the upper end of a valve shell 16 having a duct 17 extending axially therethrough. Rotatively mounted in, and extending transversely through, the mid-section of the valve shell 16, is a valve cock 18 having a machine fitted stem 19 and provided with a valve passage 20 for alignment with the valve duct 17 and an air duct 21 communicating at its outer end to the outside atmosphere and at its inner end opening upon the machine surface of the stem 19 adjacent the valve passage 20 and at 90° thereto. In its lower or outlet portion, the valve duct 17 is provided with a radial extension or auxiliary chamber 22 positioned for communication with the inner end of the air passage 21 of the valve stem 19 when the latter is rotated for registration therewith, all as best seen in Figures 3, 4, and 5 and for purposes presently more fully appearing.

Figure 1:
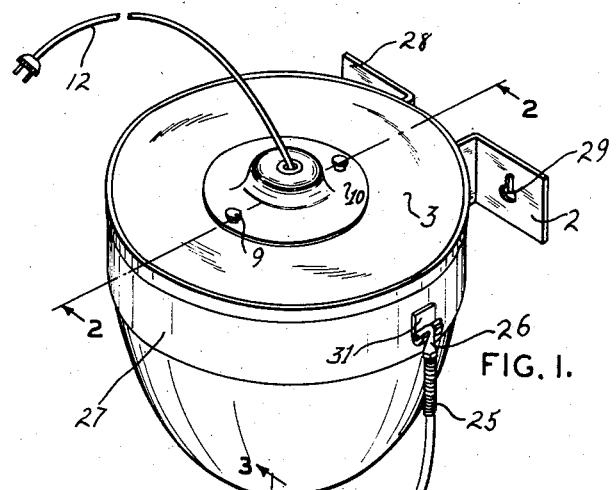
Figure 1 is a perspective view of a storage container constructed in accordance with and embodying my present invention.
Figure 3:
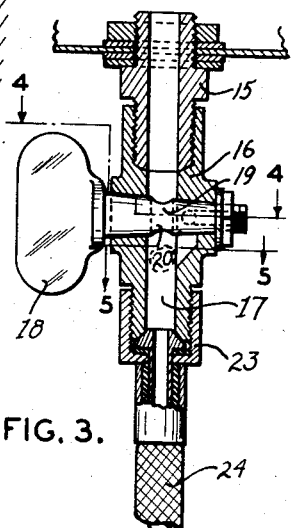
Figure 3 is an enlarged detail sectional view of the valve mechanism of my present invention.

Removably connected to the lower end of the valve shell 16 by means of conventional coupling sleeve 23, is a flexible hose 24 preferably having a predetermined volumetric capacity and provided at its lower end with a handle 25 and a spout or applicator 26, all as best seen in Figures 1 and 3.

Provided for supporting the container shell 1, is a circular band-like bracket 27 provided at its ends with outwardly flaring attachment flanges 28. The flanges 28 are provided with bayonet slots 29 for receiving wall mounting studs 30 by which the bracket may be suitably supported upon a wall or other suitable structure. Welded or otherwise rigidly mounted on the outer circumferential face of the bracket band 27, is a hook-like support member 31 for receiving the applicator or spout member 26 of the hose 24 when the latter is not in use, as best seen in Figure 1.

In actual use, the container shell 1 is filled with a solution of a predetermined temperature. The lid 3 with its associated aluminum tube 5 and heating element 13 is placed in position and the electric conduit connected to any suitable source of electric power. The heater element 13, upon becoming energized, will maintain the stored solution at substantially the same temperature at which it was placed in the container.

I have found that my present invention is particularly well suited for use in barber shops and beauty parlors, for instance, as a storage container for shampoo solutions. As will be well understood, it is desirable in performing the shampoo operations that the soap solutions used and applied to the head be at substantially the correct temperature. As a matter of fact, experience has indicated that the proper temperature for shampoo solutions is 110° F. The storage container of my present invention has proved extremely effective in maintaining the solution at this particular temperature. It would seem that the amount of heat radiating surface in the container of my present invention is such that the heat loss is substantially equivalent to the heat input from the heater element 13.

In withdrawing solution from the storage container 1, the operator or user will turn the stop cock 18 so that the valve passage 20 thereof is brought into vertical alignment with the valve duct 17. As the valve cock 18 is turned, the inner end of the air inlet 21 will be rotated out of registration with the auxiliary chamber 22 and into closed position. The stored liquid will thus flow downwardly through the valve duct 17, filling the hose 24. As soon as the liquid begins to run outwardly from the applicator or spout 26, the valve cock 18 may be turned again to "off" position, bringing the inner end of the air inlet 21 back into registration with the auxiliary chamber 22, thereby shutting off the flow of solution from the container 1 and admitting air at the top of the column of liquid in the hose 24.

Since the hose has a predetermined volumetric capacity, the volume of solution which will now drain freely downwardly out of the hose to the point of application will be of a substantially accurate measured volume. When the solution has drained out of the hose 24, the hose will be left empty and will not contain any unused residual solution which will become chilled before the next application. It will, of course, be evident that a greater or lesser quantity of solution than the predetermined volume may be delivered by allowing the stop cock 18 to remain in "on" position for a longer or shorter length of time than is ordinarily required to fill the hose 24.

It should be understood that changes and modifications in the form, construction, arrangement, and combination of parts of the storage container may be made and substituted for those herein shown and described without departing from the nature and principle of my invention.

Having thus described my invention, what I claim and desire to secure by Letters Patent is:

A storage container comprising a shell having a filling aperture, a closure for said aperture, heating means mounted on the closure and extending into the shell, valve means operably mounted in the shell and having an auxiliary air duct adapted to conduct air to the valve outlet when the valve is in "off" position, and a delivery tube operably connected to the valve and having a predetermined volumetric capacity for delivering a predetermined quantity of fluid through the delivery tube after the valve is shut off.

FRANK TURSHIN.